United States Patent [19]

Quehen

[11] Patent Number: 4,741,079
[45] Date of Patent: May 3, 1988

[54] ROLL WITH A ROTATING SHELL

[75] Inventor: André Quehen, Pontoise, France

[73] Assignee: Clecim, Courbevoie, France

[21] Appl. No.: 934,040

[22] Filed: Nov. 24, 1986

[30] Foreign Application Priority Data

Nov. 22, 1985 [FR] France .................. 85 17337

[51] Int. Cl.⁴ ............................................. B21B 13/02
[52] U.S. Cl. ..................................... 29/116 R; 29/130; 100/162 B
[58] Field of Search ......... 29/113 R, 113 AD, 116 R, 29/116 AD, 130; 162/361; 100/162 B

[56] References Cited

U.S. PATENT DOCUMENTS

| 3,879,827 | 4/1975 | Lehmann | 29/116 AD |
| 4,035,038 | 7/1977 | Hinchcliffe et al. | 29/116 R X |
| 4,106,405 | 8/1978 | Biondetti et al. | 29/116 AD X |
| 4,299,162 | 11/1981 | Hartmann et al. | 100/162 B |
| 4,651,547 | 3/1987 | Morel et al. | 29/113 AD X |
| 4,679,287 | 10/1984 | Allard | 29/116 AD |

Primary Examiner—Mark Rosenbaum
Assistant Examiner—Frances Chin
Attorney, Agent, or Firm—Pollock, Vande Sande & Priddy

[57] ABSTRACT

A roll with a rotating shell comprises, between a stationary shaft (2) in the shape of an elongate beam and a rotating shell (3) mounted for rotation around an axis on the shaft (2), a row of supporting shoes (4) with a fluid bearing. The roll is equipped with at least one device (6) for recovery of at least a part of the lubricating fluid escaping from the supporting shoes (4), the device being applied against the inner wall (30) of the jacket (3) to form with the latter a recovery zone (7) which is open in the reverse direction to the rotation of the shell, the zone (7) being connected to a circuit (8) for removing the recovered fluid.

13 Claims, 3 Drawing Sheets

ROLL WITH A ROTATING SHELL

FIELD OF THE INVENTION

The invention relates to a roll with a rotating shell capable of being employed, in particular, in a rolling mill.

BACKGROUND OF THE INVENTION

In plants for the production and/or rolling of strip materials such as paper or metal products, rolls known as "with a rotating shell" comprising a deformable tubular jacket have been used for some time.

It is known that a rolling mill generally comprises two working rolls supported respectively by at least two back-up rolls, the assembly being mounted in a stationary stand. For a variety of reasons and, in particular, in order to control the flatness of the rolled product, arrangements are provided for modifying the profile of the working rolls or of the back-up rolls. For this purpose, use is made of bending devices which act on the ends of the shafts of the rolls or, alternatively, on the profile of the external surface of the roll, a combination of both arrangements being furthermore possible. To act on the external profile of the roll, particularly in the case of back-up rolls, use is advantageously made of rolls comprising a deformable tubular jacket rotating freely around its axis on a shaft consisting of a strong beam resting on the two uprights of the stand and defining the axis of rotation. Between the stationary shaft and the tubular jacket, and over the entire length of a generatrix of the jacket, there is placed a series of shoes with fluid bearings having outwardly a cylindrical supporting face whose curvature is equal to that of the internal surface of the jacket, and each actuated by one or more jacks whose chambers are arranged within the beam or which are integrally fastened to the shoes. Oil is injected under pressure between the supporting face of the shoe and the internal surface of the jacket so as to form a film enabling the jacket to rotate owing to a hydrostatic or hydrodynamic effect, it being possible, furthermore, for both these principles to be combined. A feed system enables the thrusts of each shoe to be adjusted individually so as to control the profile of the deformable jacket, for example as a function of measurements of flatness which are performed at different points across the width of the rolled product.

At least one of the back-up rolls or, alternatively, in some cases, of the working rolls, may be equipped in this manner. A roll with a rotating shell of this type is described, for example, in applicant's French Pat. No. 83 16341.

In an arrangement of this kind, each shoe for supporting the jacket forms an inverted fluid bearing in which the shoe is stationary relative to the shell, which rotates around the shaft, and this gives rise to a number of problems of implementation on an industrial scale which are particularly due to the fct that the genetrix line of the fluid bearings is long in relation to their diameter.

As already indicated, the fluid bearings may be of a hydrostatic or hydrodynamic type.

In the most common case, where the bearings are of the hydrostatic type, each shoe comprises, on its face facing the jacket, a chamber which is fed with fluid under pressure at a certain leakage rate, enabling the lubricating film to be formed. The latter needs to be recovered in order to be cooled and reinjected into the bearings. In the case where hydrodynamic shoes are employed, the circulation of fluid in the form of a thin layer produces a heating effect and, in order to prevent the temperature from rising gradually to an excessive value, the fluid must also be recovered in order to be cooled before being reinjected into the roll.

Until now, this recovery of the lubricating fluid was carried out merely by gravity, but it was found that this recovery was difficult to implement, especially when the speed of rotation of the shell became considerable.

SUMMARY OF THE INVENTION

The object of the invention is improvements to the rolls with a rotating shell enabling the recovery and the recycling of the lubricating fluid to be performed under good conditions.

The invention thus generally applies to a roll with a rotating shell, comprising a stationary shaft in the form of an elongate beam whose ends rest on a supporting stand a rotating shell consisting of a cylindricl jacket surrounding the stationary shaft and resting on the latter by means of two centering bearings placed at both its ends and aligned along an axis of rotation and a line of shoes with a fluid bearing for supporting and adjusting the profile of the jacket, which are arranged along the shaft, each resting on the latter by means of at least one individual thrust jack and on the inner face of the jacket by means of a cylindrical support bearing, each shoe being connected to at least one circuit for supplying fluid, the latter being conveyed into the space included between the support bearing and the inner face of the jacket and escaping from the said space at a certain leakage rate.

In accordance with the invention, the roll is equipped with a device for recovery, by scraping, of at least a part of the lubricating fluid escaping from the supporting shoes, which is applied against the inner wall of the jacket to form with the latter a recovery zone which is open in the reverse direction to the rotation of the shell and which is connected to a circuit for removal of the recovered fluid.

In the preferred embodiment of the invention, the means for recovery of the lubricating fluid consists of at least one shoe forming a hydrodynamic bearing placed downstream of the line of supporting shoes in the direction of rotation and applied against the inner wall of the jacket along a generatrix of contact, the shoe comprising, on its end facing the jacket, a face which is inclined in relation to the inner wall of the jacket and forming with the latter a dihedron opening in the upstream direction from the generatrix of contact and forming a fluid-pressurization zone into which there opens a discharge passage connected to a circuit for recovery and recycling of the fluid. A plurality of recovery shoes will normally be arranged following one another along the generatrix of contact, so as to form, inside the jacket, a second line of fluid bearing shoes which are placed downstream of the first line of supporting shoes.

Each recovery shoe rests on the inner wall of the jacket by means of a contact face of small width, maintained at a slight distance from the inner wall of the jacket by the flow of the lubricating fluid at a minimum leakage rate. The pressure between the shoe and the jacket may be regulated so as to maintain the required separating distance between the contact face of the shoe and the inner wall of the jacket, with a minimum leakage rate, by modifying the flow in the fluid recovery circuit or the supporting pressure on the jacket.

BRIEF DESCRIPTION OF THE DRAWINGS

The invention will be better understood by virtue of the detailed description of an exemplary embodiment, given by way of example and shown in the attached drawings.

DESCRIPTION OF PREFERRED EMBODIMENTS

Figure 3:
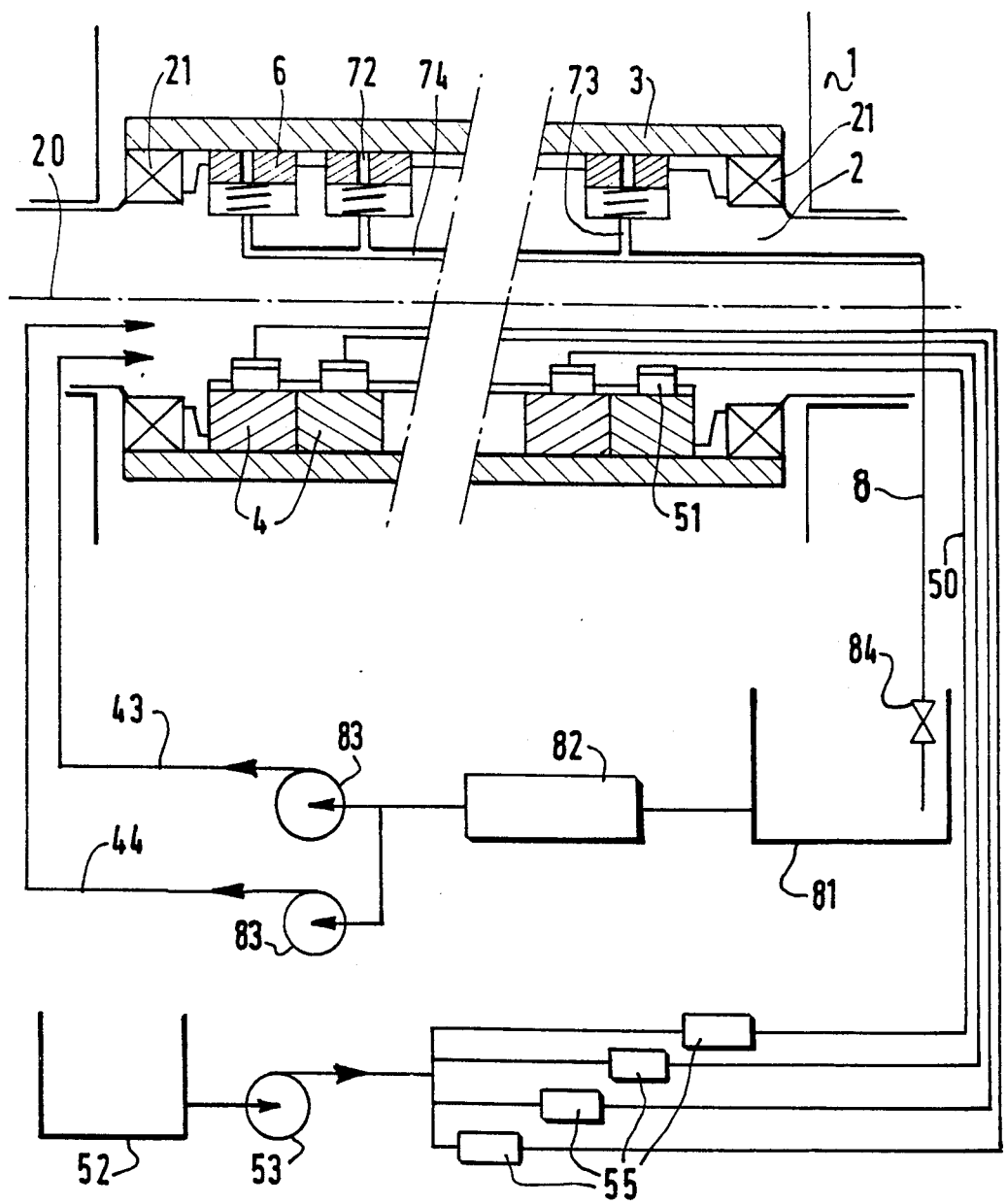
FIG. 3 is a diagrammatic view of the roll according to the invention, in axial section along the line III—III in FIG. 1.

The roll with a rotating shell which is shown diagrammatically in FIG. 3 comprises, within a stand 1, a stationary shaft 2 which is carried at its ends by two uprights of the stand 1 and onto which there is fitted a tubular jacket 3. The latter is rotationally mounted on the stationary shaft 2 by means of bearings 21 defining an axis of rotation 20. It thus forms what is frequently called a rotating shell 3.

According to a well-known arrangement, the external profile of the rotating shell 3 may be regulated by means of a series of supporting shoes 4 which are arranged along a generatrix virtually over the entire length of the inner wall of the shell 3. In the case where the roll 3 forms the upper back-up roll of the working rolls of a rolling mill, the supporting shoes 4 are centered in the vertical plane passing through the axis 20 of the roll, in the lower part of the beam 1.

On the side adjoining the inner wall 30 of the shell 3, each supporting shoe 4 has a cylindrical bearing face 40 having the same radius of curvature and on which there are provided the conditions for a hydrodynamic or hydrostatic lubrication or, alternatively, a combination of both these systems. On the other side, each supporting shoe 4 rests on an inner face 22 of the beam 1, by means of one or more hydraulic jacks comprising a chamber 5, arranged in the beam 2 or integrally fastened to the latter, and inside which there travels a plunger 51 integrally fastened to the shoe 4. A circuit 50 permits fluid to be fed under pressure to the chambers of the jacks 5, the latter being directed so as to determine a radial motion of the corresponding shoe 4. Each circuit 50 corresponding to a supporting shoe 4 is equipped with an individul means 55 for regulating the thrust pressure of the said shoe 4 as a function, in particular, of data supplied by a device for measuring flatness, which may, for example, measure the tension of the rolled product at different points distributed across the width of the latter and corresponding to the respective positions of the corresponding shoes 4. The circuits 50 are fed, for example, from a pressurized fluid unit comprissing a storage vessel 52 and a pump 53.

Furthermore, the gap between the bearing face 40 of the shoe and the inner wall 30 of the shell is supplied with fluid under pressure, for example from the chambers of the jacks 5, so as to produce a film of lubricating fluid which allows the shell to rotate.

Figure 1:
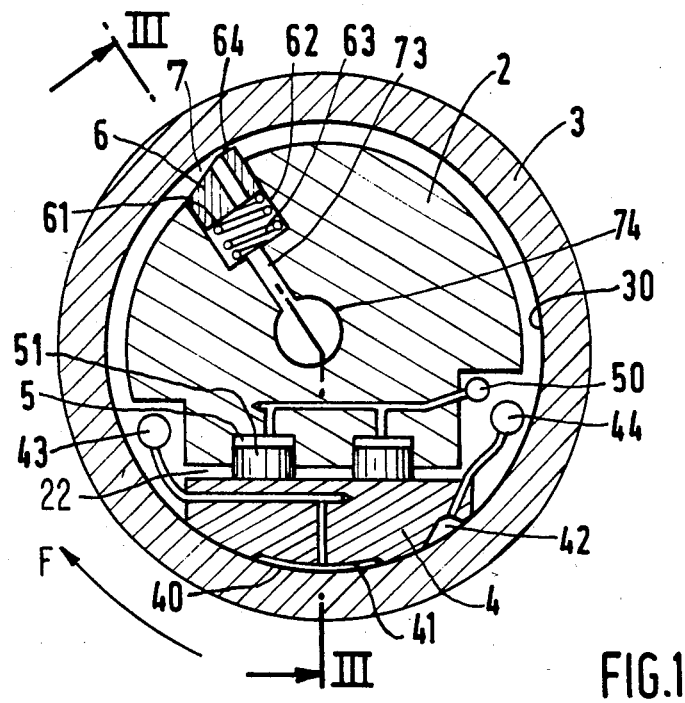
FIG. 1 shows diagrammatically, in section through a plane which is transverse to the axis, a roll with a rotating shell, equipped with the arrangements according to the invention.

In the example shown in FIGS. 1 and 3, the bearing face 40 of the shoe is equipped with fluid bearing systems, employing a hydrostatic effect 41 and a hydrodynamic effect 42, respectively, which are supplied with fluid under pressure by circuits 43 and 44, respectively. Each supporting shoe 4 thus forms a kind of fluid bearing which, in the example illustrated, combines two systems of a hydrostatic and hydrodynamic type, but which could also operate solely hydrostatically or solely hydrodynamically.

Furthermore, each fluid bearing shoe 4 exerts on the shell 3 a thrust which can be adjusted individually and which thus permits the external profile of the shell to be controlled, in particular along the generatrix of contact with the working rolls, in order to correct the flatness defects as a function of the measurements which are performed.

Such arrangements are well known and may form the subject of alternative forms which are described in numerous patents, and consequently there is no need to describe them in further detail, since the invention concerns a different subject.

In fact, whatever the system employed, be it hydrostatic, hydrodynamic or combined, it is essential for a leakage flow to exist between the bearing face 40 of the shoe and the inner wall 30 of the shell and, as a result, the lubricating fluid will spread inside the cylindrical cavity determined by the shell.

The roll with a rotating shell comprises a second line of fluid bearing shoes 6 which are placed downstream of the first line of supporting shoes 4, in the direction of rotation of the shell, indicated by the arrow F in the figure.

Each shoe 6 is integrally fastened to a plunger 61 fitted slideably along a radial direction in a chamber 62 placed in a zone situated between the stationary beam and the jacket and which may, for example, be arranged within the stationary beam 2. The plunger 61 is pushed outwards, for example by a resilient means such as a spring 63 compressed between the shoe 61 and the bottom of the chamber 62.

Figure 2:
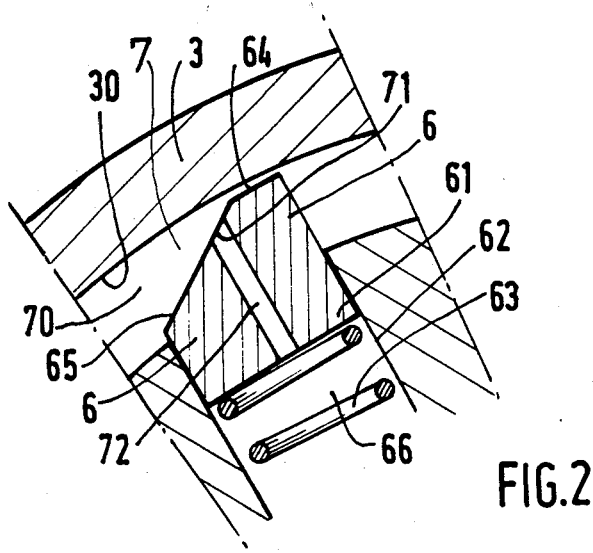
FIG. 2 is a view of a detail of FIG. 1.

As shown in greater detail in FIG. 2, each shoe 6 has, at its end facing the inner wall 30 of the shell 3, a contact face 64 which is applied by the spring 63 against the inner wall 3. This face 64 may be small in width, since the shoes 6 are not intended to provide support to the shell 3, and it may even be reduced merely to a ridge, which may be rounded. The contact faces 64 or, where applicable, the contact ridges of the various shoes 6 are aligned along a generatrix of contact from which there opens, on the upstream side in the direction of rotation of the shell 3, a dihedron 70 determined on one side by the inner wall 30 of the shell 3 and on the other by an inclined face 65 provided at the end of the shoe 6.

Throughout the nip of the shoe 6, the lubricating fluid escaping from the shoes 4 and entrained by centrifugal action with the shell 3, accumulates in the dihedron 70, which thus forms a recovery zone in which the pressure of fluid progressively increases as far as the contact face 64 as a result of the slope of the face 65 of the shoe.

A radial passage 72 is rranged in the middle part of the shoe 6, opening, at one end via an orifice 71, into the middle or downstream part of the inclined face 65 and, at the other end, into the chamber 66 provided between the bottom of the cavity 62 and the plunger 61. This chamber 66 is itself connected via a passage 73 to a central manifold 74 provided, for example, within the stationary shaft 2 and extending over the entire length of the latter so as to collect the oil recovered by all the shoes 6 of the recovery line.

The central channel 74 is connected to a recovery and recycling circuit 8, shown very diagrammatically in the figure and which may comprise, for example, a recovery vessel 81, means 82 for purifying and cooling the oil, and a pump 83 for recycling the lubricating fluid into the circuits 43 and 44 for pressure-feeding the fluid bearing systems 41 and 42 of the supporting shoes 4.

The flow in the recovery circuit 8 may be regulated, for example, by a throttle valve 84 so as to control the pressure in the recovery zone 70 and consequently the rates of leakage flowing between the contact face 64 and the inner wall 30 of the shell 3. This rate may be adjusted to a minimum value as a function of the viscosity of the fluid and of the pressure exerted by the shoe 6 against the shell under the effect of the spring 63, so that the thickness of the film of lubricating fluid of the shoe 6 is sufficient to provide the lubrication, but still low in relation to the thickness of the film of oil escaping from the supporting shoes 4. The risk of progressive heating of the lubricating fluid is thus reduced to a minimum.

It will be understood that the invention is not limited to the details of the embodiment just described merely by way of example and which could be the subject of alternative forms, particularly by the use of equivalent means, without departing from the scope of protection defined by the claims.

Thus, in the example illustrated, a description is given of the use of a line of shoes 6 extending over the entire length of the roll, but, depending on the flow of oil to be recovered, it might be sufficient to place recovery shoes only at some places in the shell. Furthermore, while it appears more logical to use a plurality of shoes arranged alongside one another, it would nevertheless also be possible to envisage the use of a single elongate shoe extending over the entire length of the internal space extending over the entire length of the internal space of the shell 3.

Furthermore, it is more economical to apply the recovery shoes 6 against the shell 3 by means of springs 63, but it would be possible to use of hydraulic jacks for this purpose, in which the pressure would be regulated as a function of the pressure in the recovery zone 70 so as to main tain the thickness of the lubricating film constant between the contact face 64 and the inner wall 30 of the shell.

In another alternative form, the supporting shoes 4 and the oil recovery shoes 6 could be combined, whereby the latter could be situated directly at the outlet of the shoes, on the downstream side in the direction of rotation of the shell.

In a general manner, furthermore, the oil recovery line could be installed in a structure which is independent of the supporting beam 2, but is placed inside the jacket 3.

Figure 4:
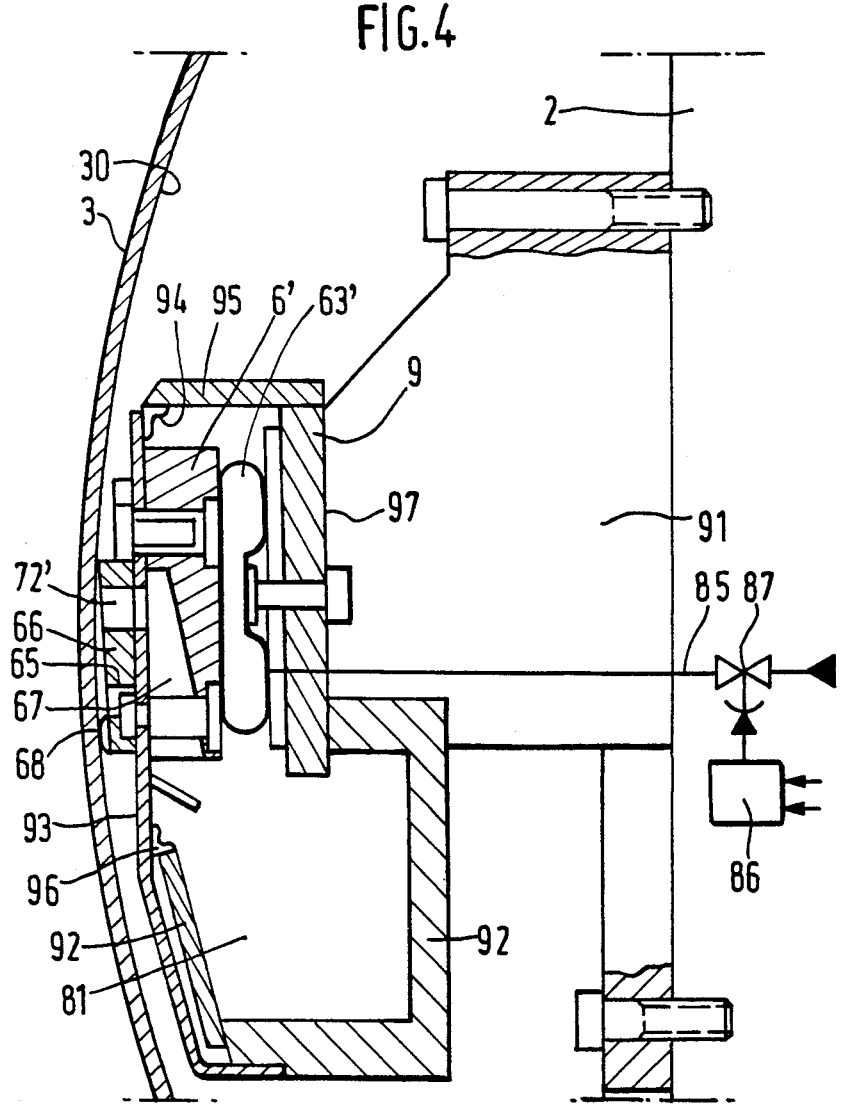
FIG. 4 is a diagrammatic view of a detail which shows, in a transverse section, another embodiment of the device for recovery.

Such arrangements are repeated in the embodiment shown diagrammatically in FIG. 4.

The recovery system consists in this case of a single shoe 6' in the form of a continuous guide bar extending over the entire length of the jacket 3 and placed inside a case 9 fastened by means of supports 91 along a side face of the shaft 2 at a desired location on the latter with relation to the supporting shoes 4. The lower part 92 of the case 9 forms a channel extending below the shoe 6' in the form of a guide bar and over the entire length of the latter, so as to constitute the oil recovery vessel 81. The shoe 6' is mounted on the upper part of a supporting plate 93 fastened with its lower part on the base of the channel 92 so as to allow a slight radial movement of the shoe 6', the upper edge of the supporting plate 93 bearing via a seal 94 on a guide plate 95 integrally fastened to the case 9 and closing the latter in its upper part. Another seal 96 is inserted between the supporting plate 93 and the upper edge of the channel 92 so as to ensure sealing of the case.

This means for applying the shoe 6' against the jacket 3 consists, in this embodiment, of a deformable closed jacket 63' of elongate shape extending over the entire length of the guide bar 66, but which may also consist of several isolated jackets distributed over the length of the guide bar 66. The deformable jacket 63' is inserted between the shoe 6' and a bearing face 97 of the case 9 and is connected to a circuit 85 for supplying fluid under pressure, for example compressed air, which makes it possible to inflate the deformable jacket 63' in order to push the shoe 6' back towards the cylindrical jacket 3.

The shoe 6' bears on the inner face 30 of the cylindrical jacket 3 by means of a flat guide bar 66, made of regulur or another antifriction material, provided with an inclined face 65.

Orifices 72' spaced at regular distances from each other are arranged along the flat guide bar 66 and pass through the supporting plate 93 so as to open into the space 67 arranged in the guide bar-shaped shoe 6' and opening downwards in order to open into the channel 92.

Lastly, at least two studs 68, also made of antifriction metal, are fastened to the side ends of the supporting plate 93, upstream of the flat guide bar 66, so as to provide the latter with stability by bearing on the inner face 30 of the cylindrical jacket.

The whole operates in the manner described above for the shoe 6', but the use of an inflatable jacket 63' to apply the shoe 6' against the jacket offers the advantage of enabling the application presure to be regulated as a function of the speed of rotation of the cylindrical jacket 3 and of the total flow of fluid escaping from the supporting shoes 4. For example, FIG. 4 shows diagrammatically a regulator 86 to the inputs of which there are applied signals representing the measured speed of rotation of the jacket 3 and the flow of oil conveyed to the supporting shoes 41–42 via the circuits 43–44, and which produces a control signal applied to a valve 87 regulating the pressure of air conveyed to the jacket 63' via the circuit 85.

I claim:

1. Roll with a rotating shell comprising:
   (a) a stationary shaft (2) in the form of an elongate beam whose ends rest on a supporting stand (1),
   (b) a rotating shell consisting of a cylindrical shell (3) surrounding the stationary shaft (2) and resting on the latter by means of two centering bearings (21) placed at both ends of the shell (3) and aligned along an axis of rotation (20);
   (c) a line of supporting shoes (4) with a fluid bearing, which are arranged along the shaft (2), each supporting shoe (4) resting on said shaft by means of at least one individual thrust jack (5) and having on the side adjoining the inner face (30) of the shell (3) a cylindrical bearing face (40);
   (d) means for injecting a lubricating fluid under pressure between said bearing face (40) and said inner face (30) of the shell, said fluid escaping at a certain leakage rate; and (e) at least one device (6) for recovery of at least a part of the lubricating fluid escaping from the supporting shoes (4), said device (6) consisting of at least one shoe forming a hydrodynamic bearing, placed downstream, in the direction of rotation of the shell, of the line of supporting shoes (4), and applied against the inner face (30) of the shell (3), said at least one shoe having an end facing the inner face of the shell (3) and forming with the latter a recovery zone (70) which is open in the reverse direction to the rotation of the shell and a circuit (8) connected to said zone (70) for removal and recycling of the recovered fluid.

2. Roll with a rotating shell according to claim 1, wherein said at least one shoe (6) comprises, on its end facing the inner face (30) of the shell (3), a contact face (64) of small width applied against said inner face (30) and a face (65) which is inclined in relation to said inner face (30), and forms with the latter a dihedron opening in the upstream direction from said contact face (64) and constituting a pressurization zone (70), said circuit (8) for removal of the recovered fluid being connected with a discharge passage (72) opening in said pressurization zone (70).

3. Roll with a rotating shell according to claim 2, wherein said contact face (64) is kept apart from the inner face of the shell (3) by a small distance forming a passage space for a minimum leakage flow of the lubricating fluid.

4. Roll with a rotating shell according to claim 2 or 15, wherein said contact face (64) is reduced merely to a ridge aligned along a generatrix of contact.

5. Roll with a rotating shell according to claim 2, comprising a plurality of recovery shoes (6) arranged in succession along a generatrix of contact (64) and forming, inside the shell, a second line of fluid bearing shoes, downstream of the first line of supporting shoes (4).

6. Roll with a rotating shell according to claim 2, wherein said at least one shoe (6) is constituted in the form of a continuous guide bar parallel to the axis of the roll and covering substantially the entire length of the shell.

7. Roll with a rotating shell according to any one of claims 1 to 3, 5 or 6, wherein each recovery shoe (6) is mounted slidably on the stationary shaft (2) in a radial direction and is associated with a means for application against the inner face (30) of the shell (3).

8. Roll with a rotating shell according to claim 7, wherein the means for application of each recovery shoe (6) consists of at least one spring compressed between the shoe (6) and the stationary shaft (2).

9. Roll with a rotating shell according to claim 7, wherein the means for application of each recovery shoe (6) consists of a deformable closed shell inserted between the shoe (6) and the stationary shaft (2) and connected to means of inflation under pressure.

10. Roll with a rotating shell according to claim 1 or 2, associated with means for regulating the pressure of application of the shoe (6) as a function of the speed of rotation of the shell (3) and of the leakage flow of the fluid lubricating the supporting shoes (4).

11. Roll with a rotating shell according to claim 3, wherein the fluid removal circuit (8) comprises means (84) for adjusting the flow in order to maintain between the shoe (6) and the shell (3) a pressure which is sufficient to maintain said distance of the contact face (64) from the inner face of the shell (3) with a minimum leakage flow.

12. Roll with a rotating shell according to any one of claims 1 to 3 or 11, wherein the fluid removl and recycling circuit (8) comprises a manifold (74) for the fluid recovered in each recovery shoe (6), which is connected to a recovery vessel (81) feeding, via purifying and cooling means (82), a pump (83) for recycling the fluid under pressure into at least one circuit (42) for supplying fluid under pressure to at least one fluid bearing system (41) of each supporting shoe (4).

13. Roll with a rotating shell according to claim 6, wherein said at least one shoe (6) is associated with a fluid recovery vessel (81) consisting of a channel (92) extending over the entire length of the shoe (6) in the shape of a guide bar and forming a tubular closed space into which open a plurality of fluid passage orifices spaced from one another.

* * * * *